(12) United States Patent
Walker et al.

(10) Patent No.: US 7,913,301 B2
(45) Date of Patent: Mar. 22, 2011

(54) REMOTE FEATURE ACTIVATION AUTHENTICATION FILE SYSTEM

(75) Inventors: William T. Walker, Evergreen, CO (US); Robert J. Serkowski, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 938 days.

(21) Appl. No.: 11/554,268

(22) Filed: Oct. 30, 2006

(65) Prior Publication Data

US 2007/0094710 A1    Apr. 26, 2007

Related U.S. Application Data

(62) Division of application No. 10/348,107, filed on Jan. 20, 2003.

(51) Int. Cl.
*H04L 9/32* (2006.01)
*H04L 9/08* (2006.01)
*H04L 29/06* (2006.01)
*G06F 12/14* (2006.01)

(52) U.S. Cl. .......... 726/18; 726/19; 726/6; 726/7; 380/278; 713/182; 713/168

(58) Field of Classification Search .......... 726/16–19, 726/5–7; 380/278, 277; 713/168, 182, 183
See application file for complete search history.

(56) References Cited

U.S. PATENT DOCUMENTS

| 4,288,659 A | 9/1981 | Atalla ............. 178/22.08 |
| 4,405,829 A | 9/1983 | Rivest et al. |
| 4,780,821 A | 10/1988 | Crossley |
| 4,811,393 A | 3/1989 | Hazard ............. 380/21 |
| 4,888,800 A | 12/1989 | Marshall et al. ....... 380/21 |
| 4,937,863 A | 6/1990 | Robert et al. |
| 5,005,122 A | 4/1991 | Griffin et al. |
| 5,023,907 A | 6/1991 | Johnson et al. |
| 5,157,663 A | 10/1992 | Major et al. |
| 5,179,591 A | 1/1993 | Hardy et al. ......... 380/21 |
| 5,204,897 A | 4/1993 | Wyman ............. 380/4 |

(Continued)

FOREIGN PATENT DOCUMENTS

EP    1 071 253 A1    1/2001

(Continued)

OTHER PUBLICATIONS

Java Skyline: Java Servlet/Server Headline News, Oct. through Dec. 1998, pp. 1-3.

(Continued)

*Primary Examiner* — Zachary A Davis
(74) *Attorney, Agent, or Firm* — Sheridan Ross P.C.

(57) ABSTRACT

A system for providing a user with authorization to perform one or more functions using or otherwise involving a computational component is provided. The system includes an authentication file system 100 operable to (a) receive a request from a user for a second set of authentication information permitting a second set of operations to be performed on a computational component, wherein the computational component is operable to be installed by the user on the computational system, wherein the computational component contains a first set of authentication information permitting a first set of operations to be performed on the computational component; and wherein the first and second sets of operations are different; (b) generate an authentication file containing the second set of authentication information; and (c) transmit the authentication file to the computational system.

19 Claims, 7 Drawing Sheets

U.S. PATENT DOCUMENTS

| | | | |
|---|---|---|---|
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | 379/189 |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,553,143 A | 9/1996 | Ross et al. | |
| 5,563,946 A * | 10/1996 | Cooper et al. | 705/56 |
| 5,579,222 A | 11/1996 | Bains et al. | |
| 5,629,980 A | 5/1997 | Stefik et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A | 4/1998 | Wyman | 705/1 |
| 5,754,761 A * | 5/1998 | Willsey | 726/30 |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | 395/187.01 |
| 5,935,243 A | 8/1999 | Hasebe et al. | |
| 5,940,504 A | 8/1999 | Griswold | 705/59 |
| 5,956,505 A | 9/1999 | Manduley | |
| 5,956,716 A | 9/1999 | Kenner et al. | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | 455/456.6 |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A * | 10/2000 | Boneh et al. | 713/193 |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,502,079 B1 | 12/2002 | Ball et al. | 705/59 |
| 6,513,117 B2 | 1/2003 | Tarpenning et al. | |
| 6,539,481 B1 | 3/2003 | Takahashi et al. | |
| 6,557,105 B1 | 4/2003 | Tardo et al. | |
| 6,574,612 B1 | 6/2003 | Baratti et al. | |
| 6,584,454 B1 | 6/2003 | Hummel et al. | |
| 6,615,347 B1 | 9/2003 | de Silva et al. | |
| 6,640,305 B2 | 10/2003 | Kocher et al. | |
| 6,654,888 B1 * | 11/2003 | Cooper et al. | 713/190 |
| 6,675,208 B1 | 1/2004 | Rai et al. | |
| 6,697,945 B2 | 2/2004 | Ishiguro et al. | |
| 6,704,885 B1 | 3/2004 | Salas-Meza et al. | |
| 6,760,324 B1 | 7/2004 | Scott et al. | |
| 6,765,492 B2 | 7/2004 | Harris | 340/686.6 |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | 455/414.2 |
| 6,785,726 B1 | 8/2004 | Freeman et al. | |
| 6,795,941 B2 | 9/2004 | Nickels | |
| 6,816,842 B1 | 11/2004 | Singh et al. | |
| 6,826,606 B2 | 11/2004 | Freeman et al. | 709/223 |
| 6,842,896 B1 | 1/2005 | Redding et al. | |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 7,032,113 B2 * | 4/2006 | Pendlebury | 713/185 |
| 7,035,918 B1 | 4/2006 | Redding et al. | |
| 7,065,214 B2 | 6/2006 | Ishiguro et al. | |
| 7,069,468 B1 | 6/2006 | Olson et al. | |
| 7,073,063 B2 | 7/2006 | Peinado | |
| 7,096,469 B1 | 8/2006 | Kubala et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,206,936 B2 | 4/2007 | Aull et al. | |
| 7,225,333 B2 | 5/2007 | Peinado et al. | |
| 7,228,426 B2 | 6/2007 | Sinha et al. | |
| 7,302,703 B2 | 11/2007 | Burns | |
| 7,308,717 B2 | 12/2007 | Koved et al. | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,356,692 B2 | 4/2008 | Bialick et al. | |
| 7,382,881 B2 | 6/2008 | Uusitalo et al. | |
| 7,383,205 B1 | 6/2008 | Peinado et al. | |
| 7,415,729 B2 | 8/2008 | Ukeda et al. | |
| 7,545,931 B2 | 6/2009 | Dillaway | |
| 7,552,166 B2 | 6/2009 | Chack | |
| 7,565,325 B2 | 7/2009 | Lenard et al. | |
| 7,716,348 B1 | 5/2010 | Redding et al. | |
| 2001/0001268 A1 | 5/2001 | Menon et al. | |
| 2001/0013024 A1 | 8/2001 | Takahashi et al. | |
| 2001/0034846 A1 | 10/2001 | Beery | |
| 2002/0001302 A1 | 1/2002 | Pickett | 370/352 |
| 2002/0010681 A1 | 1/2002 | Hillegass et al. | |
| 2002/0013722 A1 | 1/2002 | Kanaga | |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Imazu | |

| | | |
|---|---|---|
| 2002/0104006 A1 | 8/2002 | Boate et al. |
| 2002/0107809 A1 | 8/2002 | Biddle et al. |
| 2002/0112186 A1 | 8/2002 | Ford et al. |
| 2002/0116340 A1 | 8/2002 | Hellberg et al. |
| 2002/0125886 A1 | 9/2002 | Bates et al. ............... 324/307 |
| 2002/0138441 A1 | 9/2002 | Lopatic |
| 2002/0154777 A1 | 10/2002 | Candelore ............... 380/258 |
| 2002/0164025 A1 | 11/2002 | Raiz et al. ............... 380/231 |
| 2002/0169625 A1 | 11/2002 | Yang et al. |
| 2002/0169725 A1 | 11/2002 | Eng |
| 2002/0174356 A1 | 11/2002 | Padole et al. ............... 713/200 |
| 2002/0176404 A1 | 11/2002 | Girard ............... 370/352 |
| 2002/0188656 A1 | 12/2002 | Patton et al. |
| 2002/0188704 A1 | 12/2002 | Gold |
| 2003/0005427 A1 | 1/2003 | Herrero ............... 717/178 |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1 | 5/2003 | Abburi et al. |
| 2003/0095542 A1 | 5/2003 | Chang et al. |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1 | 8/2003 | Mayer et al. |
| 2003/0163428 A1 | 8/2003 | Schneck et al. |
| 2003/0172035 A1 | 9/2003 | Cronce et al. |
| 2003/0177393 A1 | 9/2003 | Ishiguro |
| 2003/0191936 A1 | 10/2003 | Kawatsura et al. |
| 2003/0208449 A1 | 11/2003 | Diao |
| 2003/0233547 A1 | 12/2003 | Gaston et al. |
| 2004/0003269 A1 | 1/2004 | Waxman et al. |
| 2004/0010440 A1 | 1/2004 | Lenard et al. |
| 2004/0010469 A1 | 1/2004 | Lenard et al. |
| 2004/0039916 A1 | 2/2004 | Aldis et al. |
| 2004/0047354 A1 | 3/2004 | Slater et al. |
| 2004/0073517 A1 | 4/2004 | Zunke et al. ............... 705/59 |
| 2004/0078339 A1 | 4/2004 | Goringe et al. ............... 705/59 |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. ............... 713/201 |
| 2004/0133794 A1 | 7/2004 | Kocher et al. |
| 2004/0162998 A1 | 8/2004 | Tuomi et al. |
| 2004/0166878 A1 | 8/2004 | Erskine et al. ............... 455/456.1 |
| 2004/0172367 A1 | 9/2004 | Chavez ............... 705/59 |
| 2004/0181695 A1 | 9/2004 | Walker ............... 713/202 |
| 2004/0181696 A1 | 9/2004 | Walker ............... 713/202 |
| 2004/0199760 A1 | 10/2004 | Mazza ............... 713/150 |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0091507 A1 | 4/2005 | Lee et al. |
| 2005/0144437 A1 | 6/2005 | Ransom et al. |
| 2005/0154877 A1 | 7/2005 | Trench |
| 2005/0185792 A1 | 8/2005 | Tokutani et al. |
| 2005/0198510 A1 | 9/2005 | Robert et al. |
| 2005/0202830 A1 | 9/2005 | Sudit ............... 455/456.1 |
| 2005/0229004 A1 | 10/2005 | Callaghan |
| 2005/0246098 A1 | 11/2005 | Bergstrom et al. ............... 701/213 |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 8/2006 | Aggarwal et al. |
| 2006/0190409 A1 | 8/2006 | Hillegass et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0107067 A1 | 5/2007 | Fountian |
| 2007/0219917 A1 | 9/2007 | Liu et al. |
| 2008/0052295 A1 | 2/2008 | Walker et al. |
| 2008/0082449 A1 | 4/2008 | Wilkinson et al. |
| 2008/0141242 A1 | 6/2008 | Shapiro |
| 2008/0189131 A1 | 8/2008 | Chavez |
| 2010/0049725 A1 | 2/2010 | Walker et al. |

FOREIGN PATENT DOCUMENTS

| | | |
|---|---|---|
| EP | 1562378 | 8/2005 |
| JP | 2006/085481 | 3/2006 |

OTHER PUBLICATIONS

Official Action for U.S. Appl. No. 10/348,107, mailed Jan. 21, 2009.
Official Action for U.S. Appl. No. 10/348,107, mailed Mar. 11, 2008.
Official Action for U.S. Appl. No. 10/348,107, mailed Sep. 6, 2007.
Official Action for U.S. Appl. No. 10/348,107, mailed Jan. 17, 2007.
Official Action for U.S. Appl. No. 10/348,107, mailed Sep. 28, 2006.
U.S. Appl. No. 11/222,997, filed Sep. 8, 2005, Rao.
FLEXlm End Users Guide, Version 9.2. Jul. 2003. Published by Macrovision. 166 pages.
A. Menezes, P. van Oorschot and S. Vanstone, Handbook of Applied Cryptography, cr8523_01[1].pdf, Chapter 1, 48 pages.
A. Menezes, P. van Oorschot and S. Vanstone, Handbook of Applied Cryptography, cr8523_1 0[1].pdf, Chapter 10, 40 pages.
A. Menezes, P. van Oorschot and S. Vanstone, Handbook of Applied Cryptography, cr8523_12[1].pdf, Chapter 12, 53 pages.
Sun Microsystems, Inc. Java Cryptography Architecture API Specification & Reference, Aug. 4, 2002, 56 pages.
U.S. Appl. No. 10/956,861, Robinson.
U.S. Appl. No. 11/051,316, Mazza.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Windows NT Server 4. Garms, Jason. SAMS Publishing, 1998. ISBN 0-672-31249-2.
Official Action for U.S. Appl. No. 10/348,107, mailed Dec. 23, 2009.
"RightNow Technologies and MarketFirst Partnership Delivers Complete E-Marketing Solution", PR Newsire, Aug. 14, 2001, p. 1.
White, Ron. How Computers Work, Millennium Edition. Que Publishing, 1999. Front Matter, Back matter, and pp. 4-13,36-37,106-111, and 122-133 included.
Stevens, W. Richard. Advanced Programming in the UNIX Environment. Addison-Wesley, 1993. Front matter, back matter ,and pp. 18-21 included.
Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.
Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.
Multos Fights On, Jan. 2004, Thomson Media, Inc., Jan. 2004, pp. 1-7.
Notice of Allowability for U.S. Appl. No. 10/348,107, mailed Oct. 5, 2010.
U.S. Appl. No. 10/811,412, filed Mar. 25, 2004, Walker.
U.S. Appl. No. 10/947,418, filed Sep. 21, 2004, Gilman et al.
U.S. Appl. No. 10/775,498, filed Feb. 9, 2004, Gilman et al.
U.S. Appl. No. 09/357,679, filed Jul. 20, 1999, Serkowski.
U.S. Appl. No. 10/231,957, filed Aug. 30, 2002, Serkowskl et al.
U.S. Appl. No. 10/232,507, filed Aug. 30, 2002, Serkowski et al.
U.S. Appl. No. 10/231,999, filed Aug. 30, 2002, Walker et al.
U.S. Appl. No. 10/232,508, filed Aug. 30, 2002, Rhodes et al.
U.S. Appl. No. 10/232,906, filed Aug. 30, 2002, Walker et al.
U.S. Appl. No. 10/232,647, filed Aug. 30, 2002, Walker et al.
ADTech Engineering, "IP Phone SI-160 User Manual (SCCP releases)," Version 1.2 (2002), pp. 1-20.

Articsoft Limited, "Public Key Infrastructure (PKI) FAQs" (02/02/03), available at http://www.articsoft.com/wp_pki_faq.htm, 5 pages.
ARSYS, "Public Key Infrastructure," (Feb. 4, 2001), available at http://www.transactiontrust.com/technicaindex.html, 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" Aug. 1, 2002; available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.
Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers, 1.0 (Nov. 2003), pp. 1-28.
LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004), available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/securityibuilding_an_iso7816_4_apdu_command.asp, pp. 1-2.
Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.
Microsoft Corporation, "Vendor Wrapper Service Provider" (Aug. 2002), available at http://msdn.microsoft.com/library/en-us/security/security/vendor_wrapper_service_provider.asp, pp. 1-2.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://www.motorola.com/LMPS/pressreleases/page888.htm, 3 pages.
NEC Infrontia Corporation Press Release, "Establishment of "SmartCardInfrontia" solutions for 'IC card'," (Mar. 13, 2002), 4 pages.
Novell®, "Certificate Server: Public Key Instrastructure," White Paper (1999), pp. 1-10.
SecurityConfig, Back Up Your Encrypting File System Private Key in Windows 2000 Download (Printed Aug. 13, 2004), available at http://www.securityconfig.com/software/alerts/back_up_your_encrypting_file_system_privatekey_in_windows_2000.html, 2 pages.
Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.
Smart Card Alliance Industry News, "Cubic Corp. Introduces New National Security and Homeland Defense" (Sep. 9, 2002), available at http://www.smartcardalliance.org/industry_news/industry_news_item.cfm?ItemID=310, 2 pages.
SSH Communications Security Corp., "Enabling Virtual Public Networks with Public Key Infrastructure," White Paper (Jan. 2004), pp. 1-9.
Streetman, Kibbee D. et al., "Public Key Infrastructure: Resources, Requirements and Recommendations," ATI IPT Special Report 00-06 (Apr. 2000), pp. 1-45.
Sun Developer Network, "Smart Card Overview," Sun Microsystems, Inc. (1994-2004), available at http://java.sun.com/products/javacard/smartcards.html, 2 pages.
NetLingo Dictionary of Internet Words, "Smart Card" (1995-0004), available at http://www.netlingo.com/lookup.cfm?term=smart+card, 2 pages.
Rankl, Wolfgang, "Smart Card Handbook," (Jun. 13, 2004), available at http://www.wrankl.de/SCH/SCH.html, 8 pages.
Russinovich, Mark, "Inside Encrypting File System, Part 1," *Windows & .NET Magazine* (Jun. 1999), available at http://www.winntmag.com/Articles/Index.cfm?ArticleID=5387 &Key=Internals, 4 pages.
Russinovich, Mark, "Inside Encrypting File System, Part 2," *Windows & .Net Magazine* (Jul. 1999), available at http://www.winntmag.com/Articles/Index.cfm?ArticleID=5592 &Key=Internals, 5 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target Search™, "PKI" (Jan. 13, 2004), available at http://whatis.techtarget.com/definition/0,289893,sid9_gc1214299,00.html, 4 pages.

* cited by examiner

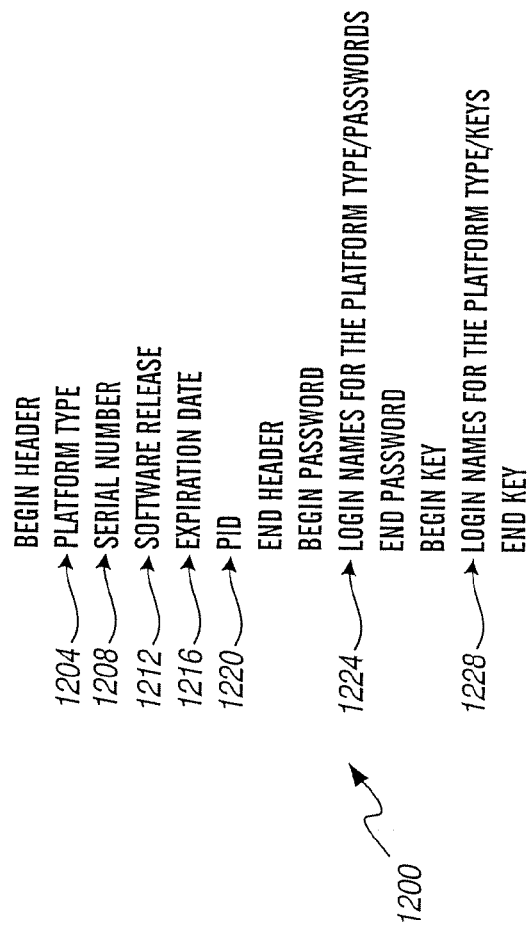

REMOTE FEATURE ACTIVATION AUTHENTICATION FILE SYSTEM

CROSS REFERENCE TO RELATED APPLICATIONS

This application is a divisional of U.S. application Ser. No. 10/348,107, filed Jan. 20, 2003, to Walker et al., which claims the benefits under 35 U.S.C. §119 of U.S. Provisional Patent Application Ser. No. 60/436,874, filed Dec. 26, 2002, to Walker et al., each of which is incorporated herein by this reference.

FIELD OF THE INVENTION

The present invention is directed specifically to authentication systems and specifically to authentication systems for telecommunication systems.

BACKGROUND OF THE INVENTION

When software is installed in a system (particularly a telecommunication system), it is often necessary to establish service logins within the system for maintenance personnel. These service logins must be very secure to prevent the existence of the login not only from presenting a security risk for the customer but also from being compromised by the customer who can then change the software and right-to-use restrictions for the software. As used herein, a "login" refers to a sequence of symbols or a combination of symbol sequences, such as a user ID or login name and a password and/or a key, that must be correctly inputted into a computational component for a user to be authorized to perform one or more functions using or otherwise involving the computational component. As will be appreciated, a "password" is a unique character or sequence of characters known to a computational component and to a user who must specify the character or character sequence to be authorized to perform one or more functions using or otherwise involving the computational component and a "key" is a sequence of symbols used with a cryptographic algorithm for encrypting or decrypting data. Examples of keys include key-encrypting keys, key-exchange keys, master keys, private keys, and public keys.

In designing a method for initializing the service logins on the system, it is desirable to meet a number of criteria. First for maximum security, each service login should have a unique access key. Second the service login access keys should be established in the system software not only when it is shipped with the system but also at the time of system installation. Default passwords, once compromised, provide little, if any, meaningful security. The software that is shipped with the system should be capable of being distributed electronically and of being copied so that a single copy can be used to install multiple systems. Third, the service logins should be capable of being initialized by a non-trusted person who does not have login privileges without compromising the login access keys. For example, many telecommunication systems are installed by technicians and business partners that are not allowed to have knowledge of the access keys. Fourth, once the logins are initialized the access key information must be known to the manufacturer or system maintenance provider. This is needed to permit service personnel to login using the access keys in the future for system maintenance. Fifth, the service logins should be able to be initialized without requiring a network or data connection from the manufacturer's or system maintenance provider's system directly to the customer's system as such direct communication is not always possible. Sixth, any system to initialize services logins should be available globally as most manufacturer's sell systems internationally. Seventh, a mechanism should be provided to ensure that the service logins are initialized on the customer's system before installation can be completed. Systems cannot be serviced without the service logins being initialized. Eighth, the access keys should be able to be updated or changed after initialization in the event that an access key is compromised. Finally, a mechanism should be provided to ensure that the login access keys for a given system can only be installed on the intended system. If the access key is installed on the wrong system, it would not be possible to access that system since its access keys would be different than those listed in the manufacturer's/maintenance provider's database.

SUMMARY OF THE INVENTION

These and other needs are addressed by the various embodiments and configurations of the present invention. The present invention is directed to an architecture and process for providing authentication information (typically in encrypted form) remotely to a computational system. As used herein, "authentication" refers to verification of the identity of a user or the user's eligibility to access an object, and "authentication information" refers to information, such as passwords, names, and keys, used by a computational component or system to perform verification of the user's identity or eligibility to access the object.

In one embodiment of the present invention, a process for providing a user with authorization to perform one or more functions, using or otherwise involving the computational component, is provided. The process includes the steps of:

(a) Providing a computational component (e.g., contact switching, routing or handling hardware and/or software) for installation by a user (e.g., a trusted or non-trusted party) on a computational system (e.g., a telecommunication switch or server). The computational component has a first set of authentication information (e.g., a login name and/or default password) permitting a first set of operations to be performed on the computational component.

(b) Receiving a request from the user for a second set of authentication information (e.g., a login name and a password and/or key) permitting a second set of operations to be performed on the computational component. The first and second sets of operations are different.

(c) Generating an authentication file containing the second set of authentication information.

(d) Transmitting the authentication file to the computational system.

In one configuration, the first set of authentication information includes a default password, and the first set of operations includes the operation of requesting delivery of the authentication file. The default password provides limited or no ability of the user to access or alter information or objects stored or otherwise contained in the computational component.

In one configuration, the computational system is associated with a unique identifier, and the authentication file includes the unique identifier. The unique identifier, for example, can be a serial number or other type of identifier of the computational component being installed or already in the computational system, such as a processor. In this manner, the authentication file is linked one-to-one with the computational system and cannot be used on a different computational system.

In yet another embodiment, a process for installing a computational component on the computational system is provided. The process includes the steps of:

(a) Providing a computational component for installation by a user on a computational system, the computational component having a first set of authentication information permitting a first set of operations to be performed on the computational component;

(b) Receiving the first set of authentication information from the user before, during, or after installation of the computational component on the computational system.

(c) Verifying the first set of authentication information.

(d) When the first set of authentication information is successfully verified, receiving a request from the user for a second set of authentication information permitting a second set of operations to be performed on the computational component.

(e) Receiving an authentication file containing the second set of authentication information.

(f) Loading the authentication file onto the computational system.

In one configuration, the loading step includes the step of validating and decrypting the authentication file. The validating step typically includes at least one of the following operations (a) determining whether or not a serial number contained in the authentication file matches a serial number associated with the computational system, (b) determining whether or not a right to use the computational component has expired, (c) determining whether or not a version contained in the authentication file matches a version of the computational component, (d) verifying data integrity of the authentication file, and (e) determining whether or not the authentication file length and format are correct.

In yet another embodiment, an authentication file for use in controlling access to a computational system is provided. The data structures in the file include:

(a) a set of login names;

(b) for each login name in the set of login names, a password and/or key; and (c) a unique identifier associated with the computational system.

The file can also include one or more of the following: a platform type associated with the computational system, a software release associated with software operating on the computational system, and a right-to-use expiration date associated with the software.

In an exemplary configuration, the steps are performed in response to a technician logging onto a central website to request an authentication file for the computational component. The website is used for license creation and delivery for computational components and already has a database record for the computational system that was generated to obtain a right-to-use license. The technician identifies the appropriate database record for the system and requests delivery of the authentication file. Password(s), key(s), and/or other authentication information are then collected and assembled into the authentication file. The file is encrypted and delivered to the technician via e-mail and downloaded to the technician's computer. The key generation and creation of authentication files is done automatically without presenting any key information to the technician. Because the file is encrypted when delivered and the security rules governing the default password severely limit the use privileges of the user, the (access) keys within the file are not compromised when the file is delivered to the technician. The technician can therefore be a trusted or non-trusted party. As used herein, a "non-trusted party" refers to a party who is not provided with access to and/or the ability to alter a defined set of information or objects. A "trusted party", on the other hand, is a party who is provided with access to and/or the ability to alter the defined set of information or objects. Examples of a non-trusted party are a purchaser of the computational component and maintenance personnel who are not employees of the manufacturer of the computational component. The computational component can thus be installed and login initialization performed by any person without regard to his or her trustworthiness. Because the login access keys are contained in a data file, the keys can be transferred to the system software without direct communication between the manufacturer and the system software. The data file can be transported to the system via magnetic media, optical media, e-mail, or other means not requiring a real-time connection.

The invention can provide a number of advantages compared to conventional systems. For example, each service login can have a unique access key, thereby providing maximum security. Second, the service login access keys can be established in the system software not only when the software is shipped with the system but also at the time of system installation. The default password, even if compromised, has extremely limited use privileges, thereby maintaining meaningful levels of security. The software that is shipped with the system is capable of being distributed electronically and of being copied so that a single copy can be used to install multiple systems. Third, the service logins can be initialized by a non-trusted person who does not have login privileges without compromising the login access keys. For example, telecommunication systems can be readily installed by technicians and business partners, without providing them with access keys. Fourth, once the logins are initialized the access key information can be readily available to the manufacturer or system maintenance provider. This permits service personnel to login using the access keys in the future for system maintenance. Fifth, the service logins can be initialized without requiring a network or data connection from the manufacturer's or system maintenance provider's system directly to the customer's system. Sixth, the system to initialize service logins can be available globally to accommodate international sales. Seventh, the service logins can be initialized on the customer's system before installation can be completed. Systems can thereby be immediately serviced. Eighth, the access keys can be updated or changed after initialization in the event that an access key is compromised. Ninth, due to the use of a unique identifier in the authentication file, login access keys for a given system can only be installed on the intended system.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 11 depicts the data structures in the platform login table;

FIG. 12 depicts the data structures in the authentication file; and

DETAILED DESCRIPTION

Overview of the Authentication File System

Figure 1:
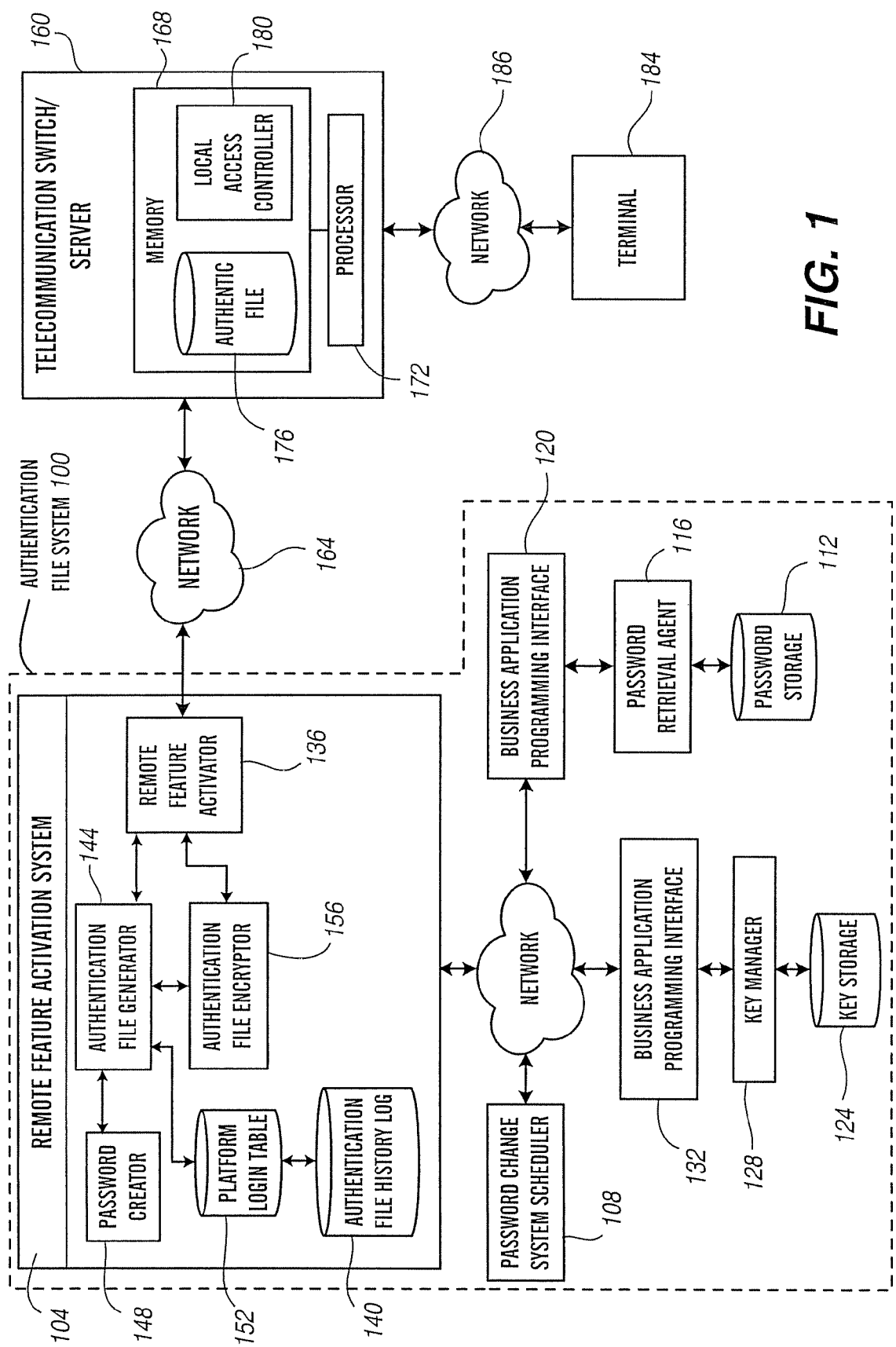
FIG. 1 is a block diagram of an authentication file system according to a first embodiment of the present invention.

Referring to FIG. 1, the authentication file system 100 comprises a remote feature activation or RFA system 104 to create, encrypt and deliver authentication files, a password change system scheduler 108 that periodically requests the RFA system 104 to provide authentication files containing new passwords according to predetermined authentication information aging policies, password storage 112 for storing and retrieving passwords and related information (e.g., a unique platform identifier or PID, a unique system identifier or SID, a unique module identifier or MID, a functional location, and platform type associated with each stored password), a password retrieval agent 116 for adding, updating, modifying, and validating of entries in the password storage 112 based on predetermined rules or policies and retrieving stored passwords, a first business application programming interface or BAPI 120 to process messages between the RFA system 104 and password retrieval agent 116, key storage 124 for storing keys and associated key information (e.g., PID, SID, MID, and platform type associated with each stored access key), a key manager 128 for creating keys, for adding, updating, modifying, and validating of entries in the key storage 124 based on predetermined rules or policies, and for retrieving stored keys, and a second BAPI 132 to process messages between the RFA system 104 and key manager 128.

The RFA system 104 comprises a remote feature activator 136 to supervise the operation of the remote feature activation system 104 and completion of the transaction records to update an authentication file history log 140 (discussed below), an authentication file generator 144 to generate authentication files, a password creator (discussed below) 148 to create a random password in response to a password creation request from the authentication file generator 144, a platform login table 152 containing a listing of the logins for each platform type based on the software release, an authentication file history log 140 containing a record of all authentication file activity (e.g., the SID associated with a switch/server, MID associated with the switch server, PID associated with the switch/server, software release, request or transaction number, request or transaction type, source of the request, date and time of transaction, success/failure of the request, and any error messages), and the authentication file encryptor 156 that converts the generic/plain text authentication file into an encrypted authentication file that is ready for delivery to the target system.

The data structures in the platform login table 152 are shown in FIG. 11. As can be seen from FIG. 11, for each platform type 1100 and release 1104 (typically of the software loaded onto the switch/server), a serial swap-out indicator 1108 (that indicates whether or not a new authentication file is required when the license file serial number is changed in the remote feature activation system record), the location 1112 in password storage 112 of the corresponding record (containing password(s)), a listing 1116 of logins or login names (an identifier associated with the user), whether a password is required (yes/no) 1120, any default passwords 1124 used before installation of an authentication file, the password length 1128 (for new password creation and existing password verification), availability of key protection (yes/no) 1132, and the key setting (on/off) 1136. The platform login table 152 is used by the authentication file generator 144 to determine what logins to put in the authentication file. The table also defines which logins require keys and which logins require passwords. The logins required for a switch/server are based on the platform (or switch/server) type or model and the software release.

Referring to FIG. 12, the authentication file 1200 typically includes the platform type 1204, serial number 1208 associated with the switch/server (typically the serial number of an associated processor in the switch/server), software release 1212, right-to-use expiration date 1216 (for the loaded software), platform ID 1220, a listing 1224 of login names and associated passwords, and a listing 1228 of login names and associated keys. The file typically contains password definitions for the logins requiring passwords and key definitions for the logins requiring keys.

A telecommunication switch/server 160, such as the DEFINITY™, 58700™, 58300™, and 58100™ switches/servers sold by Avaya, Inc., is in communication with the authentication file system 100 via PSTN 164. The switch/server 160 comprises memory 168 and a processor 172. The switch/server comprises an authentication file 176 delivered by the system 100 and a local access controller 180 for generating authentication file delivery requests and installing received encrypted authentication files on the switch/server. A terminal 184, such as a PC, is connected to the switch/server to permit users to interface with the switch/server. The terminal preferably includes a graphical user interface for the user.

The authentication file system 100 delivers authentication files to target or requesting switches/servers, that typically run on an open operating system. These authentication files contain the non-default passwords and keys for services logins to these switches/servers. Authentication file delivery generates the encrypted authentication file for delivery to the system over a geographically distributed processing network. The authentication file generator 144 interfaces with the password retrieval agent 116 for password storage and retrieval and with the key manager 128 for key generation, storage, and retrieval. The password change system scheduler 108 interfaces with the remote feature activator 136 to request authentication files periodically with new passwords and existing keys. This is done by submitting a password change request to the authentication file system 100. The activator 136 issues an authentication file request for each switch/server identified in the password change request.

Secure and unsecure users with basic (low level) logins can request authentication file delivery remotely from the authentication file system 100. The file can be delivered by any medium, such as via a switch contact (via direct dial-in to the switch/server), email or Web download. The authentication files can include new or existing passwords or keys. When system records are created for switches/servers requiring authentication files and when upgrade modules are added to a switch/server requiring password files and reflected in existing system records for the switch/server, the remote feature activator 136 sends a record creation request to the password retrieval agent 116 and key manager 128 as discussed below with reference to FIGS. 2-6. The records in password storage 112 and key storage 124 are needed to store the passwords and keys for the switch/server. When there is an existing record for a switch/server, the remote feature activator 136 sends an authentication file request where an authentication file comprising a new or existing password or new or existing key is required. This process is discussed below with reference to FIGS. 7-10 and 13. A license file or authentication file cannot be delivered for a switch/server unless a record creation request has been successfully completed for that switch/server.

When a computational component, such as hardware or software, is installed on the switch/server administrative personnel must have the ability to log onto the system as an authentication file has not yet been delivered. Typically, the hardware or software is installed with a default password. The default password permits the user to issue a request for an authentication file to be installed on the switch/server. The default password has extremely limited use privileges, which are typically limited to the right to request installation of an authentication file and certain software/hardware installation commands. In one configuration, the user cannot logon to the software being installed using the default password or otherwise access or alter the information or objects in the software. In the event that the authentication file, after installation, is erased or otherwise unusable, the default password is retained in memory to permit the user to re-install the authentication file.

Record Creation

Figure 2:
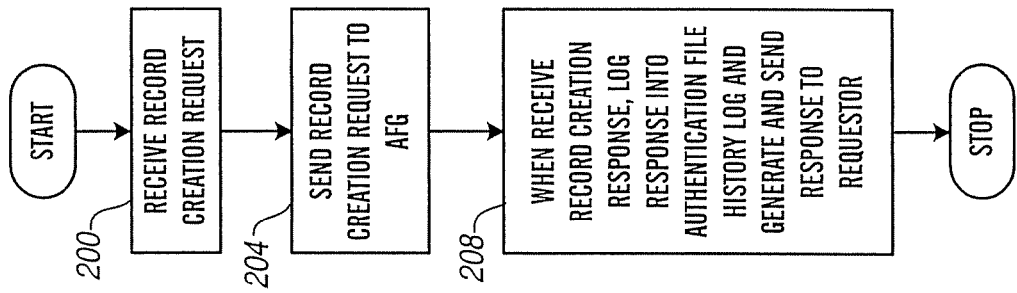
FIG. 2 is a flowchart showing an operation of the remote feature activator according to an implementation of the first embodiment.

Referring to FIG. 2, the process to create a record will now be discussed. The remote feature activator 136 in step 200 initially receives a record creation request. The request can be sent by maintenance personnel at the time of sale or installation of the switch/server or at the time of sale or installation of upgrades to the switch/server. In step 204, the record creation request is forwarded to the authentication file generator 144. The record creation request includes the system ID or SID, module ID or MID, request number, request type (module add or application add), platform type, software release, applications (for "module add" this is a listing of the applications for a given module and for "application add" this is a listing of all the applications that were added to the module), software version for each application in the record creation request, platform ID or PID, serial number associated with the switch/server, and the like).

Figure 3:
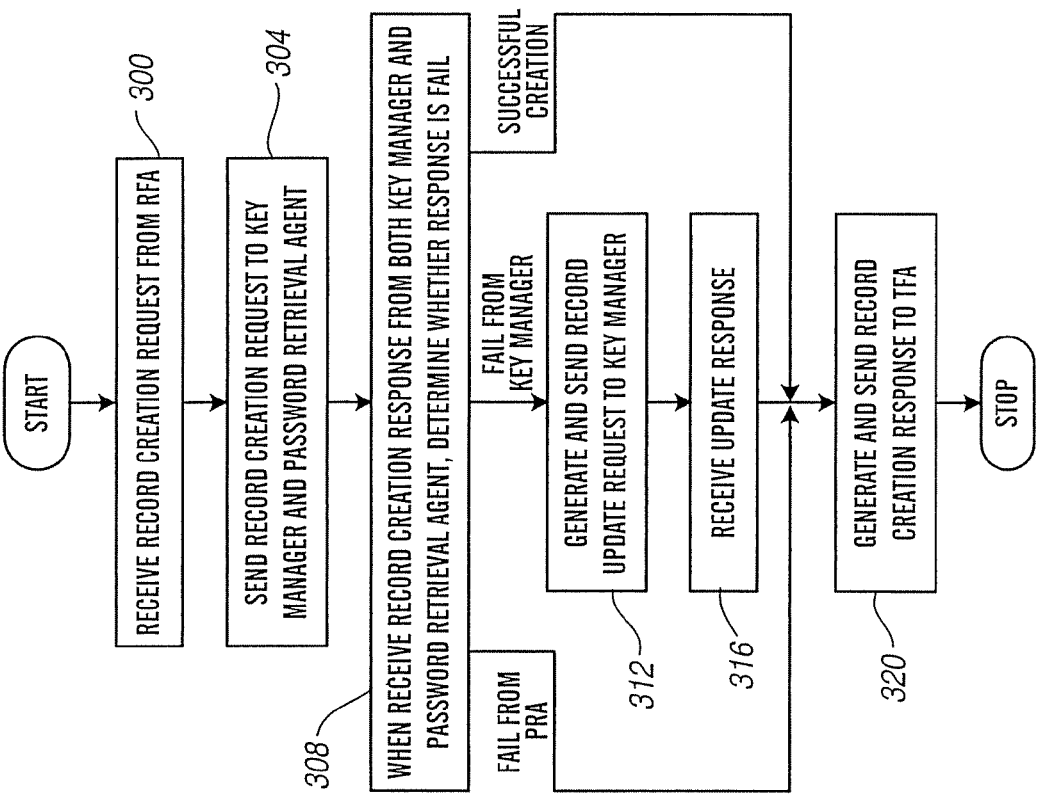
FIG. 3 is a flowchart showing an operation of the authentication file generator according to an implementation of the first embodiment.

Referring now to FIG. 3, the record creation request in step 300 is received by the authentication file generator 144. The authentication file generator 144 in step 304 forwards the record creation request to the key manager 128 and password retrieval agent 116. The record creation request to the password retrieval agent and key manager includes the SID, MID, and PID.

Figure 4:
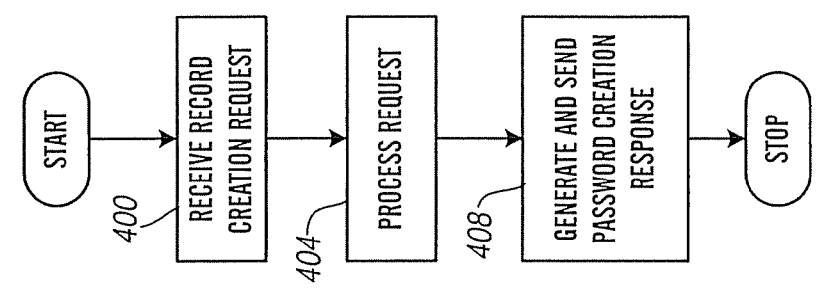
FIG. 4 is a flowchart showing an operation of the password retrieval agent according to an implementation of the first embodiment.

Referring to FIG. 4, the password retrieval agent 116 in step 400 receives the record creation request from the generator 144 and in step 404 processes the request. The agent 116 sets up a record for the switch/server, by either creating a new record or modifying an existing record and assigning a platform PID if needed, to the switch/server. In step 408, the agent 116 returns a record creation response authentication file generator 144. The response includes the SID, MID, PID, an indicator regarding whether or not the record was successfully created, and any error messages.

Figure 5:
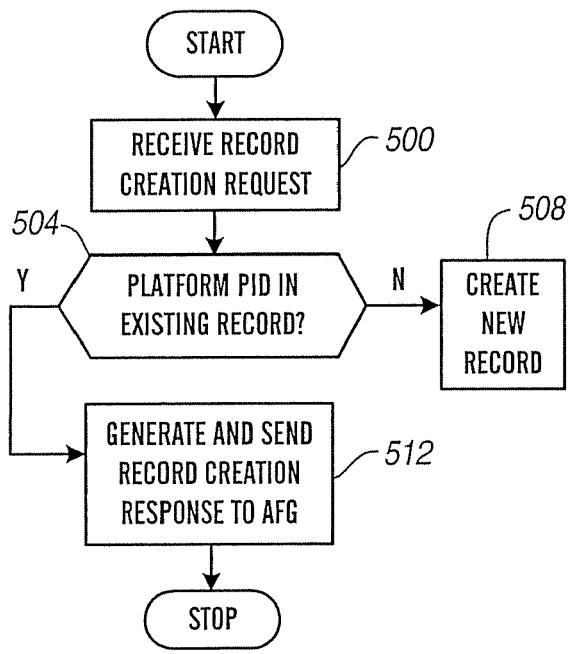
FIG. 5 is a flowchart showing an operation of the key manager according to an implementation of the first embodiment.

Referring now to FIG. 5, the key manager 128 in step 500 receives the record creation request from the generator 144. In decision diamond 504, the manager 128 determines whether or not the platform PID included within the request is already in an existing record in key storage 124. If the PID in the request is not already in a record, the manager 128, in step 508, creates new keys for each login and a new record. Key storage 124 stores one or more versions of the confirmed keys for each switch/server and the last delivered keys if they have not yet been confirmed. This storage allows login to the switch/server when the last delivered authentication file was not successfully installed. If the PID in the request is already in a record, the record creation request fails.

In step 512, the manager 128 generates and sends a record creation response (containing the platform PID) to the authentication file generator 144. The response includes an indicator of the success or failure of the request.

Referring again to FIG. 3, the authentication file generator 144, when record creation responses from both the password retrieval agent 116 and key manager 128 are received, determines in step 308 whether the response is a pass or fail.

Figure 6:
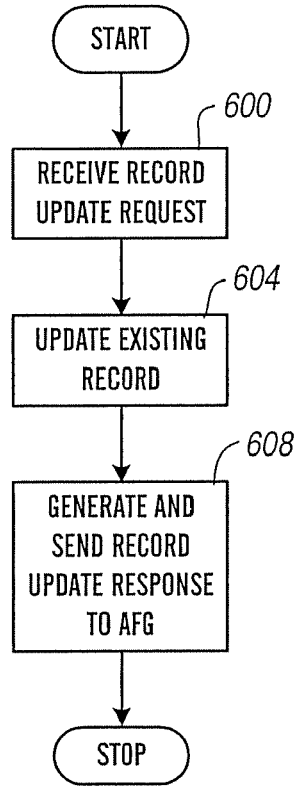
FIG. 6 is a flowchart showing an operation of the key manager according to an implementation of the first embodiment.

When the response from the key manager indicates a failure due to there being an existing record in key storage, the generator 144, in step 312, generates and sends a record update request to the key manager 128. The update request includes the SID, MID, and PID associated with the switch/server. Referring to FIG. 6, the manager 128 in step 600 receives the record update request and in step 604 updates the existing record in key storage 124 containing the platform PID. In step 608, the manager 128 generates and sends a record update response to the authentication file generator 144. The response contains the SID, MID, an indicator of the success or failure of the record update request, and any error messages. As will be appreciated, failure is deemed to exist when a record having the platform PID in the update request cannot be located in key storage 124. In step 316 of FIG. 3, the generator 144 receives the response.

After step 316 or when the record creation response from the password retrieval agent 116 includes a failure indicator or when the record creation response from the agent 116 or manager 128 includes a success indicator, the generator 144 performs step 320. In step 320, the generator 144 generates and sends an overall record creation response to the remote feature activator 136. The response includes the SID, MID, PID, request number, the success or failure of the record creation operation in password storage 112 and key storage 124, and any error messages.

Returning again to FIG. 2, the remote feature activator 136 in step 208 receives the overall record creation response, logs the response into the authentication file history log 140 and generates and sends a response to the requester. If the response includes an error message indicating that a record creation request failed or if the activator 136 gets no response from the generator 144 to a record creation request, the response to the requester shall be an error message, and no requests for a license file or authentication file delivery shall be allowed. Such requests will only be allowed if a record creation request is successfully acted upon.

Authentication File Delivery

Figure 7:
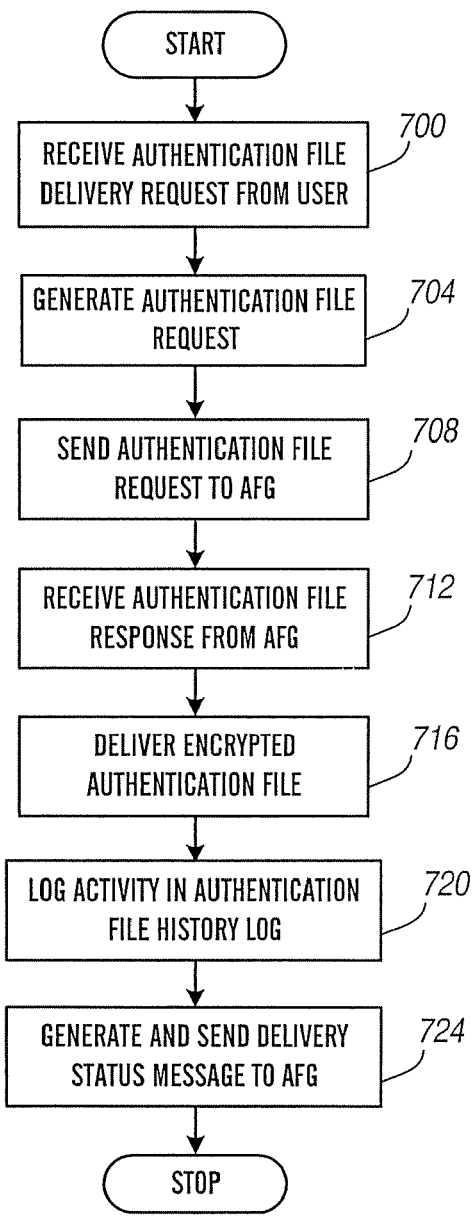
FIG. 7 is a flowchart showing another implementation of the remote feature activator according to the first embodiment.

Referring to FIG. 7, authentication file delivery will now be discussed.

In step 700, an authentication file delivery request is received by the remote feature activator 136 from the user of the terminal 184 or a user connected directly to the authentication file system 100.

In step 704, an authentication file request is generated by the remote feature activator 136 and in step 708 sent to the authentication file generator 144. The authentication file request is either for new or existing passwords and/or new or existing keys. The authentication file request typically includes the SID associated with the switch/server, the MID associated with the switch/server, a request number, a platform type, an application description, a software version, the PID associated with the switch/server, a serial number associated with the switch/server, an expiration date of a right-to-use, a password type (new or existing), and a key type (new or existing).

Figure 8A:
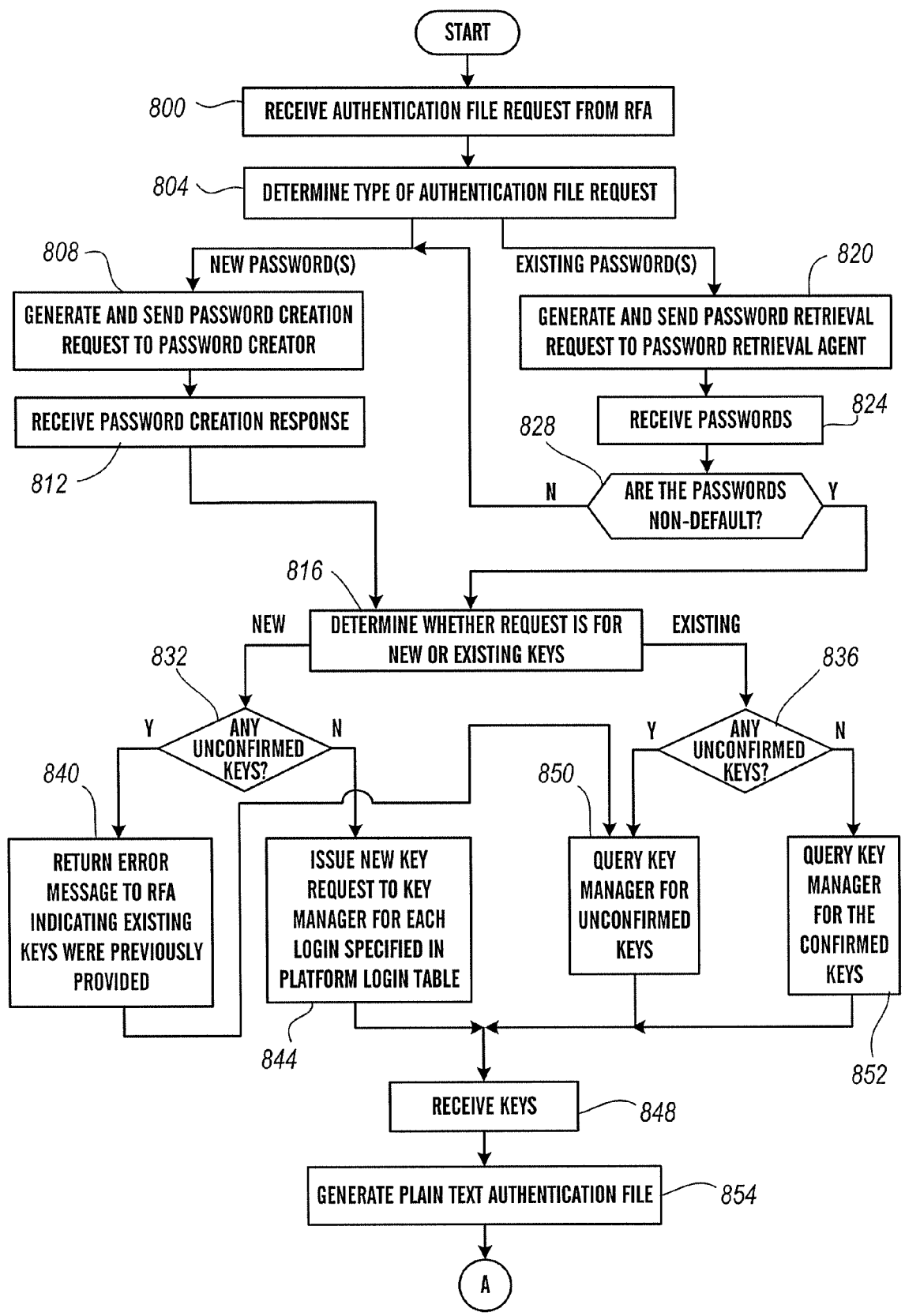
FIGS. 8A and 8B are flowcharts showing another implementation of the authentication file generator according to the first embodiment.

Referring to FIG. 8A, the authentication file generator 144 receives in step 800 the authentication file request from the activator 136. The generator 144 determines whether there is a pending authentication file request for the specified switch/server (SID or PID) (i.e., an authentication file has been delivered to the activator 136 but the activator 136 has not yet responded with a delete information request). If there is a pending request for the switch/server, the passwords and keys delivered in the authentication file shall be the same passwords as delivered in the pending request. If there is not a pending request for the switch/server, the generator 144, in step 804, determines the type of authentication file request received from the activator 136.

Figure 9:
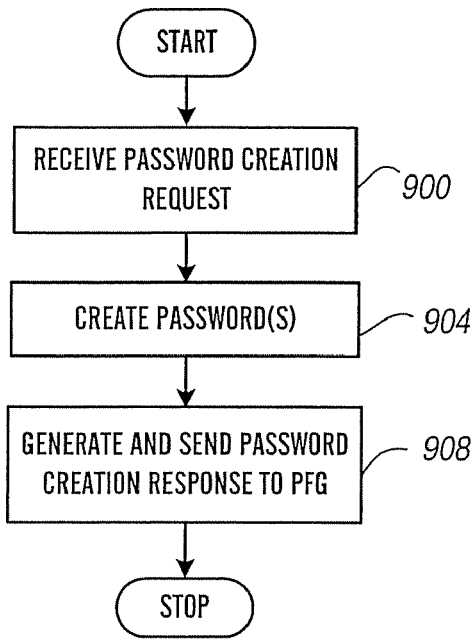
FIG. 9 is a flowchart showing another implementation of the password creator according to the first embodiment.

When the request is for new passwords, the generator 144 proceeds to step 808 and generates and sends a password creation request to the password creator 148 (one request per login). Referring to FIG. 9, the creator 148 receives the password creation request in step 900 and creates the requested random password(s) according to predefined rules in step 904 (one password/login). The password length of the new passwords is specified in the platform login table. In step 908, the creator 148 generates and sends the newly created password(s) back to the generator 144 in a password creation response.

Returning to FIG. 8A, the generator 144 in step 812 receives the password creation response. The generator 144 does not allow the passwords for different logins to be the same. If this occurs, the generator 144 requests another new password. The generator 144 then proceeds to step 816 (discussed below).

When the request is for existing password(s), the generator 144 proceeds to step 820 and generates and sends a password retrieval request to the password retrieval agent 116. The password retrieval request includes the SID, MID, and login names for which passwords are needed. The password retrieval agent 116 retrieves the password(s) and sends a password retrieval response (including the SID, MID, a success/failure indicator and, if located, the password(s) for each login name) back to the generator 144. The password retrieval response is received by the generator 144 in step 824.

In decision diamond 828, the generator 144 determines whether there is an existing valid password(s) for a login that requires a password (e.g., there is a password, the password is of the length specified in the platform login table, the password is the default as specified in the platform login table 152). If there is no existing valid password, the generator proceeds 144 to step 808 discussed above. If there is an existing valid password, the generator proceeds to step 816.

In step 816, the generator 144 determines whether the authentication file request is for new or existing keys. When the request is for new keys, the generator proceeds to decision diamond 832 and, when the request is for existing keys, proceeds to decision diamond 836.

In decision diamond 832, the generator 144 determines whether there are any unconfirmed keys. As used herein, an "unconfirmed key" refers to a key that has been generated but has not been successfully delivered while a "confirmed key" refers to a key that has been generated and successfully delivered. This is done by sending a key confirmation status request (containing the SID and MID) to the key manager 128. In response, the key manager returns a message including the SID, MID, and an indicator if there any unconfirmed keys for the switch/server are present. When there are unconfirmed keys and an authentication file with existing keys is to be generated, the generator returns an error message to the remote feature activator 136 in step 840 indicating that existing keys were previously provided. The generator then proceeds to step 850 (discussed below). When there are no unconfirmed keys and an authentication file with existing keys is to be generated, the generator in step 844 issues a new key request to the key manager 128 for each login specified in the platform login table. The new key request includes the SID, MID, and login for which the key is needed. In step 848, the requested new keys are received by the generator 144.

In decision diamond 836, the generator 144 determines whether there are any unconfirmed keys. This is done by sending a key confirmation request to the key manager. When there are unconfirmed keys, the generator 144 in step 850 queries the key manager for the unconfirmed key. When there are no unconfirmed keys, the generator 144 in step 852 queries the key manager 128 for the confirmed keys. The key request includes the SID, MID, key type (current key or unconfirmed key), and the login for which the key is needed. The unconfirmed or unconfirmed keys, as the case may be, are received by the generator 144 in step 848 and later used in the authentication file.

Figure 8B:
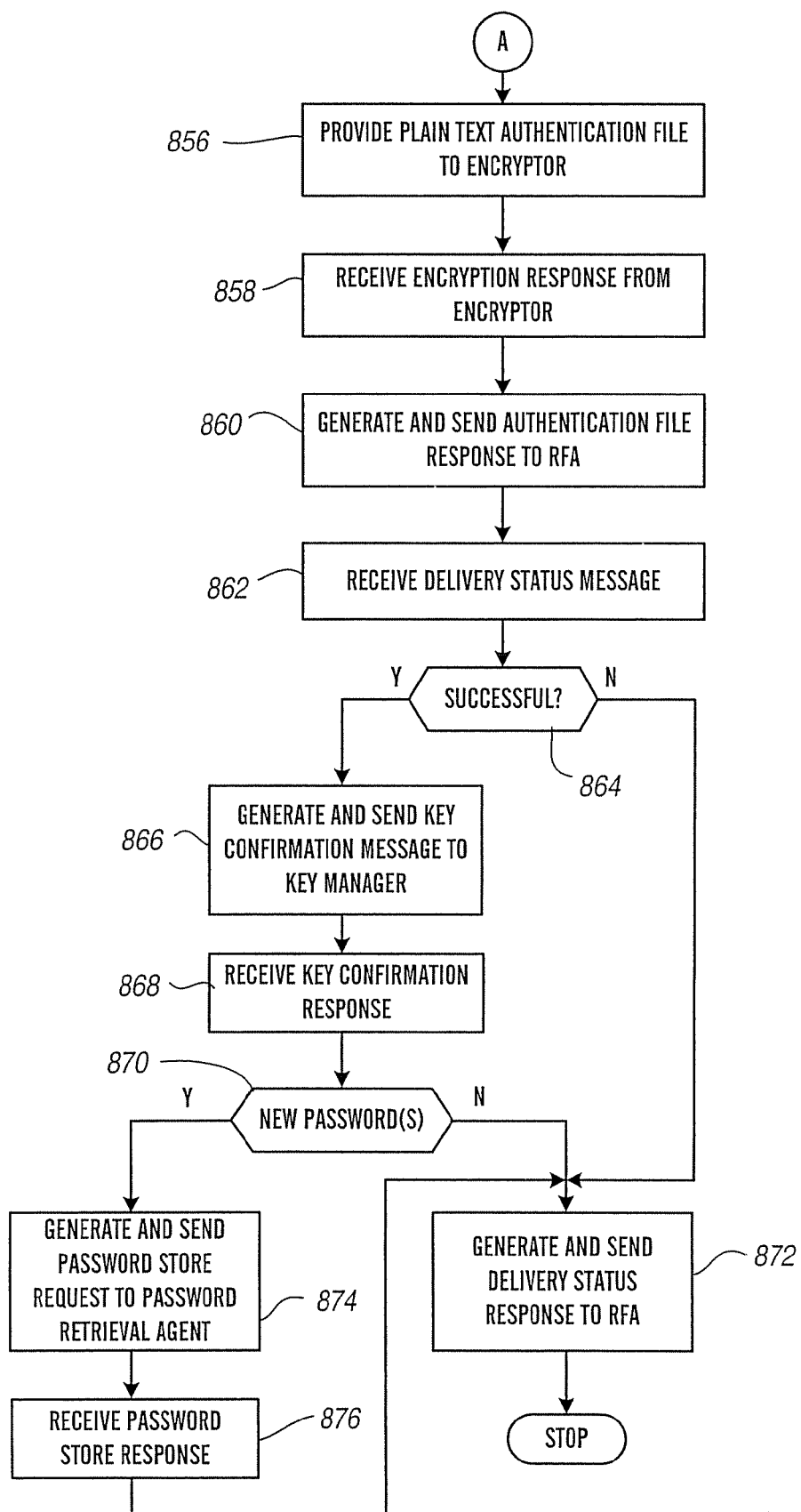
Figure 10:
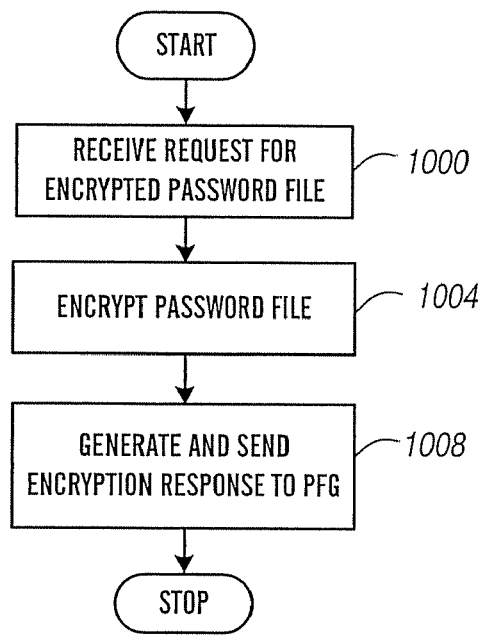
FIG. 10 is a flowchart showing another implementation of the encryptor according to the first embodiment.

Referring to FIGS. 8A and 8B, the generator 144 assembles the authentication file in plain text form in step 854 and provides the plain text file to the encryptor 156 in step 856. Referring now to FIG. 10, the encryptor 156 receives the encryption request, containing the plain text file, in step 1000, encrypts the file in step 1004, and returns an encryption response containing the encrypted authentication file to the generator 144 in step 1008.

In step 858, the generator 144 receives the encryption response from the encryptor 156 and, in step 860, generates and sends an authentication file response to the remote feature activator 136. The response includes the SID, MID, request number, the success or failure of the authentication file request, encrypted authentication file information (e.g., file name and location), new or existing password(s), new or existing keys, and any error messages.

Referring again to FIG. 7, the remote feature activator 136 receives the authentication file response from the generator in step 712. In step 716, the encrypted authentication file is delivered via PSTN 164 to the switch/server and/or via network 186 to the terminal 184 for installation on the switch/server. In step 720, the activity is logged into the authentication file history log 140 (e.g., including request type, source of the request, date and time, success/failure of the request, and any error messages). In step 724, a delivery status message is generated and sent to the generator 144 including the SID, MID, request number, and the success or failure of the delivery to the switch/server or terminal. A successful delivery is not necessarily the same event as a successful installation on the switch/server. An authentication file can be successfully delivered but never installed on the switch/server.

Referring again to FIG. 8B, the generator 144 in step 862 receives the delivery status message. In decision diamond 864, the generator 144 determines if the delivery status message indicates a delivery success or failure. If the delivery was successful, the generator 144 in step 866 generates and sends a key confirmation message to the key manager 128. The key confirmation message contains the delivered newly created keys and the PID of the switch/server. Only newly created (or otherwise unconfirmed) keys require confirmation to the key manager. The key manager confirms the keys for the switch/server and sends a key confirmation response back to the generator 144 indicating that the keys were successfully confirmed. The key confirmation response is received by the generator 144 in step 868.

In decision diamond 870, the generator 144 next determines whether new password(s) were provided to the switch/server. When new password(s) were provided to the switch/server, the generator 144 in step 874 generates and sends a password store request to the password retrieval agent 116. The password store request includes the SID, MID, PID, and the new password(s). The agent 116 updates the record corresponding to the switch/server in password store 112, and generates and sends a password store response to the generator 144. The response includes the SID, MID, an indicator of the successful completion of or failure to complete the password store request, and any error messages. The response is received by the generator 144 in step 876. When no new password(s) were provided to the switch/server (decision diamond 870), when the delivery status message indicates a failure (decision diamond 864), or after completion of step 876, the generator 144 generates and sends a delivery status response message to the remote feature activator 136. The message includes the SID, MID, request number, the success/failure of the key confirmation, the message ID of the password storage request, and any error messages. Once any new passwords have been successfully stored in password storage 112, the activator 136 sends a delete information request (which includes the SID, MID, and request number) to the generator 144, indicating that the temporary record created by the generator 144 with the encrypted authentication file can be deleted. In response to the delete information request from the activator 136, the generator 144 deletes the record associated with the authentication file delivery (e.g., the record containing the plain text authentication file) and returns a response message to the activator 136 indicating the success/failure of the record deletion. The response message includes the SID, MID, request number, and the success/failure of the record deletion.

Installation of the Delivered Authentication File

Figure 13:
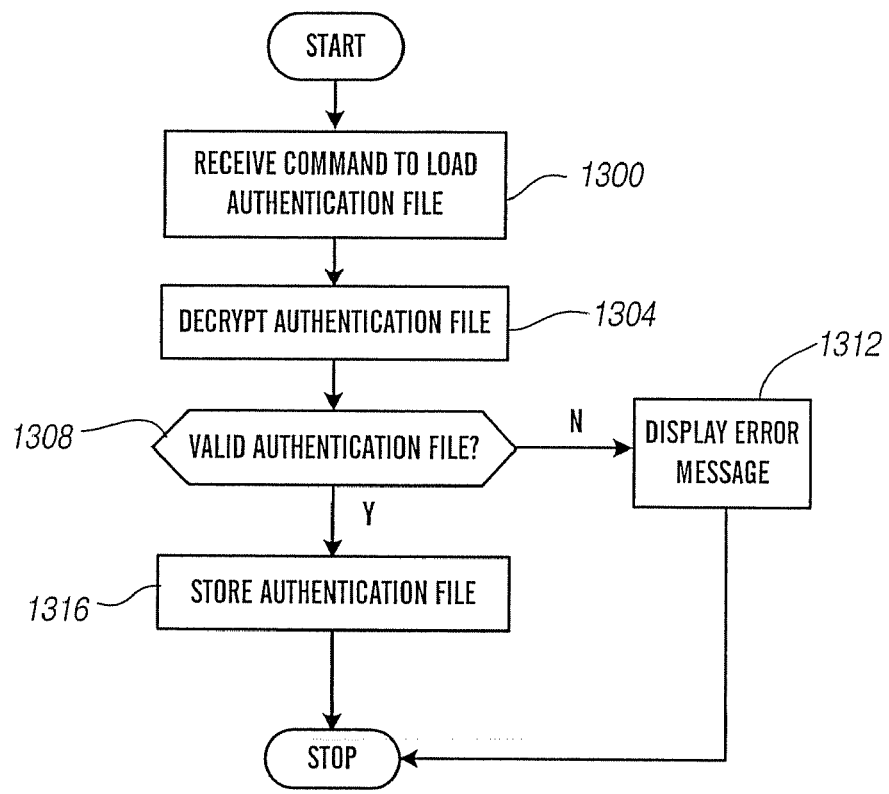
FIG. 13 is a flowchart of an implementation of the local access controller.

FIG. 13 depicts the operation of the local access controller 180 when a decrypted authentication file is received by the telecommunication switch/server 160. In step 1300, the load authentication file command is invoked, such as by a user of terminal 184. In step 1304, the controller 180 decrypts the new authentication file (after receipt of the file from the authentication file system 100).

In decision diamond 1308, the local access controller 180 performs a series of checks to determine if the authentication file is valid. The local access controller 180 confirms that the serial number 1208 contained in the authentication file 1200 (FIG. 12) matches the serial number of the active processor in the switch/server 160, that the right-to-use has not expired, that the version or release contained in the authentication file matches the software version or release loaded onto the switch/server 160, the authentication file has data integrity by using a checksum or other suitable approach, and that the authentication file length and format are correct.

If one or more of the preceding queries is not confirmed, the local access controller proceeds to step 1312 and displays a suitable error message to the user and terminates operation.

If each of the queries is confirmed, the new authentication file is stored in translation in step 1316. The new authentication file overwrites the authentication file already in memory.

Once the file is installed, the logins are initialized and the access keys within the file are used by the controller 180 to authenticate users attempting to login using a service login. To ensure that the file is installed and service logins are activated, the controller 180 will not provide full functionality until a valid authentication file is installed. The authentication file delivery and loading steps in the installation process cannot be skipped or forgotten because additional installation steps cannot be completed unless the authentication file is in place.

If it is necessary or desired to change the access keys after initial installation of the telecommunication switch/server, a new authentication file with new access keys can be requested from the authentication file system 100 website, delivered to the technician, and installed on the switch/server 160. A date/time stamp is used in each authentication file to ensure that, when a new authentication file is installed in place of an existing authentication file on a switch/server, the new file is in fact newer than the existing file. This prevents accidental installation of an older file, which would result in the access keys of record in the key storage 124 differing from the access keys on the switch/server.

When it is necessary to log into the authentication file system using a service login, the key manager accesses key storage to locate and retrieve the unique key for the switch/server from which the login request is received. The key is used to successfully provide the correct response to the access challenge generated by the authentication file system 100 based on the same access key in the authentication file installed on the switch/server 160.

A number of variations and modifications of the invention can be used. It would be possible to provide for some features of the invention without providing others.

For example in one alternative embodiment, the various modules referenced herein are implemented as software, hardware (e.g., a logic circuit), or a combination thereof.

In another alternative embodiment, the division of the various functions performed by the various modules in the authentication file system are different.

In another alternative embodiment, the authentication file can include fields for any number of unique identifiers for the same or differing types of hardware components. For example, for validation of the authentication file to be successful the local access controller could require that there be matches for serial numbers not only of a control processor but also of an application specific integrated circuit or another type of hardware component.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects he in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for installing a computational component on a first computational system, comprising:
    providing a computational component for installation by a user on a first computational system, the computational component having a first set of authentication information permitting a first set of operations to be performed on the computational component, wherein the first set of authentication information corresponds to a first login and comprises a first key and/or password, and wherein the first set of operations comprises requesting delivery of a second set of authentication information;
    receiving, at a network interface of a remote feature activation system, the first set of authentication information from the user before, during, or after installation of the computational component on the first computational system;
    verifying, at the remote feature activation system, the first set of authentication information;
    after the first set of authentication information is successfully verified, receiving a request from the user for the second set of authentication information, which permits a second set of operations to be performed on the computational component, the first and second sets of operations being different, wherein the first set of operations provides access by the user to fewer validly licensed operational features than the second set of operations;
    receiving an authentication file containing the second set of authentication information, the second set of authentication information comprising a unique identifier of the first computational system, corresponding to a second login, and comprising a second key and/or password, whereby the unique identifier links the second set of authentication information with the first computational system such that the second set of authentication information cannot be used on a second computational system having a different unique identifier; and
    loading the authentication file onto the first computational system.

2. The method of claim 1, wherein the first computational system is a telecommunication switch or server and the computational component is software to be loaded onto the switch or server, wherein the first set of operations provides, at most, only limited access to validly licensed operational features and the second set of operations provides full access to validly licensed operational features, and the method further comprising:
    determining, by the first computational system, whether or not the unique identifier contained in the second set of authentication information matches the unique identifier of the first computational system;
    determining, by the first computational system, whether or not a right to use the computational component has expired;
    determining, by the first computational system, whether or not a version contained in the second set of authentication information matches a version of the computational component;
    wherein when the unique identifier in the second set of authentication information matches the unique identifier of the first computational system, when the right to use the computational component has not expired, and when the version in the second set of authentication information matches the version of the computational component, the second set of authentication information is considered to be valid; and
    wherein when one or more of the following is true: when the unique identifier in the second set of authentication information does not match the unique identifier of the first computational system, when the right to use the computational component has expired, or when the version in the second set of authentication information does not match the version of the computational component, the second set of authentication information is considered to be invalid.

3. The method of claim 1, wherein the first set of authentication information comprises a default password and the first set of operations comprise requesting delivery of the authentication file.

4. The method of claim 1, wherein the unique identifier is a serial number of a processor in the first computational system.

5. The method of claim 1, wherein the user is a non-trusted party.

6. The method of claim 1, wherein the second set of operations comprise logging onto the computational component and accessing information contained therein.

7. The method of claim 1, wherein the authentication file is received in encrypted form.

8. The method of claim 1, wherein the loading step comprises:
    validating the authentication file; and
    decrypting the authentication file.

9. The method of claim 8, wherein the validating step comprises at least one of the following operations (a) determining whether or not a serial number contained in the authentication file matches a serial number associated with the first computational system, (b) determining whether or not a right to use the computational component has expired, (c) determining whether or not a version contained in the authentication file matches a version of the computational component, (d) verifying data integrity of the authentication file, and (e) determining whether or not the authentication file length and format are correct.

10. The method of claim 1, wherein the authentication file further comprises a platform type associated with the first computational system, a software release associated with software operating on the first computational system, and a right-to-use expiration date associated with the software.

11. A first telecommunication system, comprising:
a computational component, the computational component having a first set of authentication information permitting a first set of operations to be performed on the computational component, wherein the first set of authentication information corresponds to a first login and comprises a first key and/or password, and wherein the first set of operations comprises requesting delivery of a second set of authentication information; and
a local access controller operable to receive the second set of authentication information at a network interface, verify the second set of authentication information, and, if the second set of authentication information is successfully verified, load the second set of authentication information into the first telecommunication system, wherein the second set of authentication information permits a second set of operations to be performed on the computational component and wherein the first and second sets of operations are different, wherein the first set of operations provides access by the user to fewer validly licensed operational features than the second set of operations, wherein the second set of authentication information comprises a unique identifier of the first telecommunication system, corresponds to a second login, and comprises a second key and/or password, whereby the unique identifier links the second set of authentication information with the first telecommunication system such that the second set of authentication information cannot be used with a second telecommunication system having a different unique identifier.

12. The system of claim 11, wherein the computational component is software to be loaded onto the first telecommunication system.

13. The system of claim 11, wherein the first set of authentication information comprises a default password and the first set of operations comprise requesting delivery of an authentication file.

14. The system of claim 13, wherein the unique identifier is a serial number of a processor in the first telecommunication system.

15. The system of claim 13, wherein the authentication file is received in encrypted form.

16. The system of claim 13, wherein the local access controller is operable to validate the authentication file and decrypt the authentication file.

17. The system of claim 16, wherein validation comprises at least one of the following operations (a) determining whether or not a serial number contained in the authentication file matches a serial number associated with the first telecommunication system, (b) determining whether or not a right to use the computational component has expired, (c) determining whether or not a version contained in the authentication file matches a version of the computational component, (d) verifying data integrity of the authentication file, and (e) determining whether or not the authentication file length and format are correct.

18. The system of claim 11, wherein the user is a non-trusted party.

19. The system of claim 11, wherein the second set of operations comprise logging onto the computational component and accessing information contained therein.

* * * * *